United States Patent

[11] 3,622,589

[72] Inventor Masao Tanaka
 Tokyo-to, Japan
[21] Appl. No. 800,241
[22] Filed Feb. 18, 1969
[45] Patented Nov. 23, 1971
[73] Assignee Kyowa Hakko Kogyo Kabushiki Kaisha
 (Kyowa Hakko Kogyo Co., Ltd.)
 Tokyo-to, Japan
[32] Priority Feb. 27, 1968
[33] Japan
[31] 43/11953

[54] PROCESS FOR PRODUCING PYRIDOXINE-4,5-CYCLICMONOPHOSPHATE
 10 Claims, No Drawings

[52] U.S. Cl. .................................................. 260/297,
 260/297.5, 260/999
[51] Int. Cl. .................................................. C07d 31/28
[50] Field of Search ........................................... 260/297,
 297.5

[56] References Cited
 FOREIGN PATENTS
 1,447,410  6/1966  France ......................... 260/297

*Primary Examiner*—Alan L. Rotman
*Attorney*—Bacon & Thomas

ABSTRACT: A process is provided for preparing pyridoxine-4,5-cyclicmonophosphate and salts thereof by phosphorylating a derivative of 1,5-dihydro-8-methylpyrido [3, 4, *e*], [1, 3] dioxepin -9-ol or derivative or salt thereof. Pyridoxine-4,5-cyclicmonophosphate is useful as an intermediate in the preparation of pyridoxal-5-phosphate as pyridoxine-5-phosphate.

A PROCESS FOR PRODUCING PYRIDOXINE-4,5-CYCLICMONOPHOSPHATE

BACKGROUND OF THE INVENTION AND DESCRIPTION OF THE PRIOR ART

Pyridoxine-4,5-cyclic-monophosphate (referred to hereinafter as PIN-Cyc-P) is a biochemical precursor and an intermediate in the preparation of pyridoxal-5-phosphate as pyridoxine-5-phosphate. Pyridoxine (vitamin $B_6$) is important as a precursor of pyridoxal-5-phosphate. Pyridoxal-5-phosphate is a coenzyme of various enzymatic reactions in living bodies.

PIN-Cyc-P has been synthesized by directly phosphorylating pyridoxine or a salt thereof [Japanese Pat. applications Nos. 49295/67 and 45325/67].

GENERAL DESCRIPTION OF THE INVENTION

For the purpose of overcoming defects found in the prior art, I have discovered that PIN-Cyc-P can be obtained with better yield by the process according to the present invention as hereinafter described and claimed.

An object of the present invention therefore is to provide a process for preparing PIN-Cyc-P with better yield than found in the prior art.

Another object of the present invention is to provide a process for preparing PIN-Cyc-P in an economical manner.

Other objects and features will be apparent upon reading the undergoing specification and claims.

PIN-Cyc-P, which has the following formula:

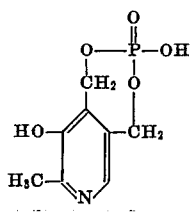
(I)

and salts thereof are prepared according to the present invention by phosphorylating a derivative of 1,5-dihydro-8-methyl-pyrido [3, 4, e.], [1, 3] dioxepin-9-Ol of the following formula:

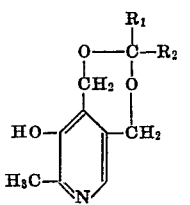
(II)

or a salt thereof wherein $R_1$ and $R_2$ are each hydrogen, lower alkyl, lower alkenyl or aryl or $R_1$ and $R_2$ together are lower alkylene.

In this specification, the term lower alkyl denotes a linear or branched chain saturated hydrocarbon residue, e.g., methyl, ethyl, propyl, isopropyl, etc., and the term lower alkenyl denotes a linear or branched chain unsaturated hydrocarbon residue, e.g., 2-propenyl group, etc. Lower alkylene groups include, for example, lower polymethylenes such as pentamethylene. The term salt denotes an acid addition salt, etc., hydrochloric acid, sulfuric acid, oxalic acid, toluene sulfonic acid, etc.

The 1,5-dihydro-8-methylpyrido [3, 4, e.], [1, 3] dioxepin-9-ol of formula (II) above or salts thereof which is used as the starting material for the process of this invention can advantageously be prepared by reacting 4,7-dihydro 1,3-dioxepin with oxazole.

PIN-Cyc-P can be prepared by directly phosphorylating a compound represented by formula (II) or salts thereof, e.g., hydrochloric acid salt. Various known phosphorylating agents may be used for the purpose of this invention. Exemplary agents include acid chloride type or acid anhydride type phosphorylating agents, e.g., phosphorous oxychloride, pyrophosphoric acid, polyphosphoric acid, tetrachloro pyrophosphoric acid. Phosphorylation via imidoyl phosphoric acid may also be employed, e.g., phosphorylation with phosphoric acid, pyrophosphoric acid or esters thereof together with dicylohexyl carbodiimide, etc. If desired, various other conventional agents may also be used.

The desired product, PIN-Cyc-P, is easily hydrolyzed under basic conditions. Accordingly, the phosphorylation should not be carried out under conditions which require disadvantageous removal of protective groups(s) after phosphorylation. Accordingly, it is advantageous to utilize phosphorylation procedures employing polyphosphoric acid, phosphorous oxychloride, etc. Phosphorous oxychloride together with a suitable amount of water or alcohol (e.g., a lower alkanol) is preferable for good results.

The phosphorylation reaction can be carried out in a suitable solvent, e.g., an organic solvent such as benzene, chloroform trialkyl phosphate, etc. The reaction may also be performed directly in the absence of solvent with a suitable phosphorylating agent. The reaction can be carried out at a temperature from $-10°$ C. to $100°$ C. (preferably about $50°$ C.). The reaction temperature varies depending upon the type of phosphorylating agent, etc. Under preferred temperatures and other conditions, the reaction is completed within about 2 to 10 hours.

Known compounds of formula (II) which have been synthesized and can be used in the present process include the following:

1,5-dihydro-8-methylpyrido [3, 4, e.], [1, 3] dioxepin-9-ol;
1,5-didhydro-8-methyl-8-phenylpyrido [3, 4, e.], [1, 3] diox-epin-9ol; 1,5-dihydro-3,3,8-trimethylpyrido [3, 4, e.], [1, 3] dioxepin-9-ol; 1',5'-dihydro-8'-methylspiro-[cyclohexane-3'-pyrido (3, 4, e.), (1, 3) dioxepin]-9-ol, etc.

After the completion of the reaction, water is added to the reaction mixture. When a solvent is used, the solvent is removed by a suitable method such as extraction. PIN-Cyc-P is separated from the obtained crude aqueous solution. The desired product can be directly crystallized. It is possible to neutralize the crude solution by using a suitable salt such as a Ca or Ba salt and to treat the resultant product with an ion exchange resin.

After this, the purified aqueous solution is concentrated and the concentrate is crystallized to give crystals of PIN-Cyc-P in good yield. The obtained PIN-cyc-P is identical with the standard preparate of PIN-Cyc-P as determined by using IR and UV spectra, nuclear magnetic resonance spectrum, components, elementary analysis, reaction with quinone chlorimide reagent and ferrous chloride, pK value, etc.

SPECIFIC EMBODIMENTS

The following nonlimitative examples illustrate the invention:

EXAMPLE 1

Twelve grams of 1,5-dihydro-3,3,8-trimethyl pyrido [3, 4, e], [1, 3] dioxepin-9-ol were added to a separately prepared solution of phosphorous oxychloride (92 ml.) and water (20 ml.). The reaction was carried out for 2 hours at $50°$ C. and then the reaction mixture was combined with ice water to make about 200 ml. which was left standing for cooling until whitish needle crystals formed. The crystals were separated by filtration and recrystallized to yield 3.6 grams of PIN-Cyc-P. The obtained product was brown colored at about $160°$ C. Its melting point and decomposition point were not clearly determined. Color reaction of phenol by quinone was positive. Molecular formula: $C_8H_{10}O_5NP$; Molecular weight 231.14;

Elementary analysis:
Found C:41.58; H:4.57; N:5.96; P:13.21
Calculated C:41.58; H:4.33; N:6.06; P:13.39

UV and IR spectra were identical with those of standard preparate of PIN-Cyc-P.

EXAMPLE 2

Ten grams of 1,5-dihydro-3-methylpyrido [3, 4, e], [1, 3] dioxepin-9-ol were added to a separately prepared solution of phosphorous oxychloride (90 ml.) and ethanol (20 ml.). The reaction was carried out for 3 hours at 40° C. and the reaction mixture was treated in a similar manner to that described in example 1 to yield 5.2 grams of PIN-Cyc-P.

EXAMPLE 3

Ten grams of 1,5-dihydro-3-isopropyl-8-methylpyrido [3, 4, e], [1, 3] dioxepin-9-ol hydrochloride were added to a separately prepared solution of polyphosphoric acid which had been prepared by mixing 85 percent phosphoric acid and phosphorous pentrachloride (1:1). The reaction was carried out for 6 hours at 30° C. and then the reaction mixture was combined with ice water to make about 500 ml. The solution was passed through a resin column packed with one liter of Dianion SK No. 1A (a strongly acidic cation exchange resin available from Mitsubishi Kasei Kogyo K.K., Japan) in its H+ form. The resin was eluted with water and one liter of slightly acidic fraction having an absorption of 320 m$\mu$ was collected, concentrated to 50 ml., and cooled to give crystals which were separated and dried to yield PIN-Cyc-P (27.2 g.).

EXAMPLE 4

Ten grams of 1,5-dihydro-3-phenyl-8-methylpyrido [3, 4, e], [1, 3] dioxepin-9-ol were added to a mixture of triethyl phosphate (250 ml.) and tetrachloropyrophosphoric acid (10 ml.) at 0° C. The reaction was carried out for 8 hours. The reaction mixture was combined with water (500 ml.). The organic solvent was extracted with benzene to give an aqueous solution which was treated in a manner similar to that described in example 3 to yield PIN-Cyc-P (5.8 g.).

I claim:
1. A process for preparing pyridoxine-4,5-cyclic-monophosphate of the formula

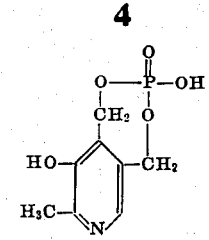

or acid addition salts thereof, comprising phosphorylating a derivative of 1,5-dihydro-8-methylpyrido [3, 4, e], [1, 3]dioxepin-9-ol of the formula

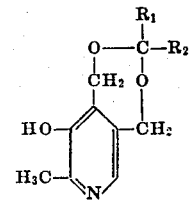

or acid addition salts thereof wherein $R_1$ and $R_2$ are each hydrogen, lower alkyl, lower alkenyl or phenyl or $R_1$ and $R_2$ together are lower alkylene.

2. The process of claim 1 wherein the phosphorylation is conducted with an acid chloride or acid anhydride phosphorylating agent.

3. The process of claim 1 wherein the phosphorylation is conducted with phosphorous oxychloride, pyrophosphoric acid, polyphosphoric acid or tetrachloro pyrophosphoric acid.

4. The process of claim 1 wherein the salt is a salt of an organic or inorganic acid.

5. The process of claim 4 wherein the salt is a slat of hydrochloric acid, sulfuric acid, oxalic acid or toluene sulfonic acid.

6. The process of claim 1 wherein the phosphorylation is carried out in the presence of solvent.

7. The process of claim 6 wherein the solvent is water, lower alkanol, benzene, chloroform or trialkyl phosphate.

8. The process of claim 1 wherein the phosphorylation is carried out at from −10° to 100° C.

9. The process of claim 8 wherein the phosphorylation is carried out for about 2 to 10 hours.

10. The process of claim 1 wherein $R_1$ and $R_2$ are each methyl, ethyl, propyl, isopropyl, 2-propenyl or phenyl or $R_1$ and $R_2$ together are pentamethylene.

* * * * *